United States Patent [19]

Hewitt et al.

[11] Patent Number: 5,578,797
[45] Date of Patent: Nov. 26, 1996

[54] METHOD AND APPARATUS FOR PRINTING MERCHANDISING INFORMATION

[75] Inventors: Richard C. W. Hewitt, Washington; Michael J. Rawlings, Rockaway, both of N.J.; Joseph Sielski, Orange, Calif.

[73] Assignee: Ishida Co., Ltd., Kurita, Japan

[21] Appl. No.: 230,711

[22] Filed: Apr. 21, 1994

Related U.S. Application Data

[62] Division of Ser. No. 877,144, May 1, 1992, abandoned.
[51] Int. Cl.$^6$ .................................................... G01G 23/38
[52] U.S. Cl. .................................. 177/5; 346/9; 428/40.1; 156/360
[58] Field of Search ................................ 177/2–5; 346/9; 428/40, 41, 42, 40.1, 41.7, 41.8, 42.1, 42.2, 42.3; 156/360

[56] References Cited

U.S. PATENT DOCUMENTS

| | | | |
|---|---|---|---|
| 3,738,263 | 6/1973 | Combs et al. | 346/46 X |
| 4,229,794 | 10/1980 | Foster | 177/4 X |
| 4,440,248 | 12/1984 | Teraoka | 177/4 |
| 4,521,267 | 6/1985 | Jacobson | 156/249 |
| 4,598,780 | 7/1986 | Iwasaki et al. | 177/4 X |
| 4,630,067 | 12/1986 | Teraoka | 177/4 X |
| 4,693,329 | 9/1987 | Hikita | 177/4 |
| 4,700,791 | 10/1987 | Iwasaki et al. | 177/2 |
| 4,832,513 | 5/1989 | Ikekita | 177/4 X |
| 4,842,303 | 6/1989 | Molenda | 281/38 |
| 4,843,405 | 6/1989 | Morikawa et al. | 346/1.1 |
| 4,884,645 | 12/1989 | Knothe et al. | 177/180 |
| 4,936,693 | 6/1990 | Ohsawa | 177/4 X |
| 5,039,848 | 8/1991 | Stoken | 235/194 |
| 5,061,946 | 10/1991 | Helmbold et al. | 346/1.1 |
| 5,172,936 | 12/1992 | Sullivan et al. | 283/81 |
| 5,178,419 | 1/1993 | Bolnick et al. | 283/81 |
| 5,275,855 | 1/1994 | Kobayashi et al. | 428/40 |

FOREIGN PATENT DOCUMENTS

| | | |
|---|---|---|
| 2611964 | 3/1987 | France . |
| 2072101 | 9/1981 | United Kingdom . |
| 2077970 | 12/1981 | United Kingdom . |

OTHER PUBLICATIONS

Abstract of Japanese Application No. 60–161167, vol. 9, No. 326 (M–441) Dec. 21, 1985.

*Primary Examiner*—Michael L. Gellner
*Assistant Examiner*—Randy W. Gibson
*Attorney, Agent, or Firm*—Staas & Halsey

[57] ABSTRACT

A weighing scale which includes a label printer for printing labels having a detachable portion. A label cassette is easily inserted or removed from the weighing scale. The label cassette is changed depending on the type of label to be printed. Standard labels can be printed, or labels having detachable portions along one side can be printed. The detachable portion can have merchandising information printed thereon including coupon information, advertising information, discounts, specials, and product information. The information on the label and detachable portions is easily edited by an operator at a control panel of the weighing scale. A conversational display is provided which allows easy editing and also allows specials, recipes, etc., to be displayed. A molded cover is provided to prevent moisture from entering the weighing scale without interfering with the operation of the weighing scale.

4 Claims, 8 Drawing Sheets

40

**LG. SHRIMP
16-20 COUNT**

IN A LARGE PAN BRING TO THE
BOIL EQUAL PARTS WATER & BEER.
ADD CAJUN SPICES (IF DESIRED)
BOIL FOR 5 MIN'S OR UNTIL
SHRIMP TURN PINK.
SERVE HOT OR CHILLED OVER ICE.

42

7.99    0.51

APR 15.92

0 200002 303660

.50

ON ONE

9OZ PACKET

OF

BEST FOODS

**CAJUN
SPICES**

APR 19.92

$3.66
~~$4.00~~

44

46

41

METHOD AND APPARATUS FOR PRINTING MERCHANDISING INFORMATION

This application is a divisional of Ser. No. 07/877,144, filed on May 1, 1992, now abandoned.

BACKGROUND OF THE INVENTION

1. Field of the Invention

The present invention provides a method and apparatus for printing merchandising information including programming labels, entering product and merchandising information and printing a label including merchandising information at the point of weighing or labelling. The merchandising information includes product information such as a special price, advertising information, and/or product information along with a coupon for a related item.

2. Description of the Related Art

Generally, labels for items purchased at a deli department or bakery department in a grocery store are printed at a weighing station. The labels are preprogrammed into a weighing scale and are printed on command. The labels contain a description of the item, weight, price per pound and UPC code.

Coupons are distributed in a variety of different ways including through newspapers, attached to items to be purchased, or generated at a checkout. Coupons printed in newspapers, magazines, or other related media must be clipped by the consumer, taken to a store and redeemed. The problem with this method is that there is little control over how many coupons are produced and no control as to when and where the coupons will be redeemed. Producing these types of coupons is also very expensive and lacks impact because they are unfocused from a merchandising point of view.

Coupons generated in-store at the point of sale (POS) require a separate printer interfaced to the POS system. The problem with this method is that coupons are generated after a customer has paid and therefore are only useable at the next time of purchase. This does not promote impulse purchases.

SUMMARY OF THE INVENTION

It is an object of the present invention to provide a label/detachable merchandising information printer as an integral part of a weighing scale, the merchandising information being easily changed.

It is another object of the present invention to produce labels for randomly weighed items provided with label/merchandising information in which the merchandising information includes a detachable store-generated coupon or a coupon printed by a manufacturer and/or advertising information.

Yet another object of the present invention is to provide label/merchandising information which can be used with any type of weighing scale, is easily edited and has the option of printing up to three dates and a time.

Still another object of the present invention is to provide label/merchandising information such that specials can be displayed or scrolled on a display without the need for performing special additional programming.

Another object of the present invention is to provide a durable molded plastic cover for a weighing scale which prevents moisture and condensation from entering the interior of the scale.

The above-mentioned objects of the present invention are obtained by providing a method for printing merchandising information comprising the steps of programming label designs, entering product and merchandising information and printing a label including the product and merchandising information. Programming the label designs includes the steps of determining general field position parameters, determining field positions for each label, converting the field positions into coordinate numbers, programming the coordinate numbers into a desired label format and generating a label in accordance with the desired label format. In addition, the generated label has a portion which is perforated for easy detachability. The perforated portion of the label includes coupon information, product information, merchandising information and/or advertising information. Product and merchandising information is entered by creating and storing a table of merchandising messages in a microprocessor for each of the products to be sold, programming the table of merchandising messages into sales messages, programming products to refer to the sales messages, editing the sales messages to change the merchandising messages and changing the text of the sales messages by editing the contents of the sales messages. A label is printed by selecting a label cassette containing desired label designs, inserting the label cassette into a scale/label printer, selecting a product number for the product being weighed and printing a label with product information and a selected message in accordance with the selected product number.

In addition, the present invention provides labels for use in a weighing machine in which a label cassette is easily inserted or removed from a cavity in the weighing machine. The labels have a detachable portion. A printer prints the labels to be attached to the weighed product with product information and prints the detachable portion of the labels with, for example, merchandising information. As noted above, the merchandising information includes, for example, coupon information, advertising information or product information. The detachable portion of the label is detachable in a vertical direction along a left or right portion of the label or in a horizontal direction along a top or bottom portion of the label.

Further, a weighing scale having internal electronics is provided including a weighing platter for holding a product to be weighed, a weighing cross for determining the weight of the object on the weighing platter and a molded plastic cover for covering the weighing scale and preventing moisture from entering the internal electronics of the weighing scale. The molded plastic cover is located under the weighing cross so as not to interfere with the weighing operation. It can be held in place with screws or similar devices. The molded plastic cover can be molded into two pieces, the two pieces being joined together by an adhesive and in such a manner as to not allow moisture or condensation into the weighing scale. One of the two pieces of the molded plastic cover has an opening with a flap for allowing receipt of a label cassette.

These objects, together with other objects and advantages which will be subsequently apparent, reside in the details of construction and operation as more fully hereinafter described and claimed, reference being had to the accompanying drawings, forming a part hereof, wherein like reference numerals refer to like parts throughout.

DESCRIPTION OF THE PREFERRED EMBODIMENTS

The present invention is directed to a method and apparatus for producing labels. The labels are printed in a portion of a weighing scale 20 provided with a removable label cassette 22. The removable label cassette 22 includes, for example, a roll of label material (not shown). A label format is programmed and then printed on the label material when an item is weighed. Various cassettes including various label materials can easily be inserted or removed from the weighing scale. Information is printed on the label material and can include, for example, product information, ingredient information, recipes, sell by dates, use by dates, store receipt dates, a time, price per pound, weight of the product, total price, discount price, and UPC symbol. The label material can have a perforated portion on any of its four sides. The perforation allows merchandising information, including advertisements, manufacturers coupons or store coupons, printed thereon, to be easily detached from the label (product) information which includes, for example, the name of the product, the weight of the product, UPC code, and price per pound. The coupon can include, for example, information pertaining to any discounts, specials on the purchased item, advertising, cents-off on a product, UPC code, expiration date, etc.

Figure 1:
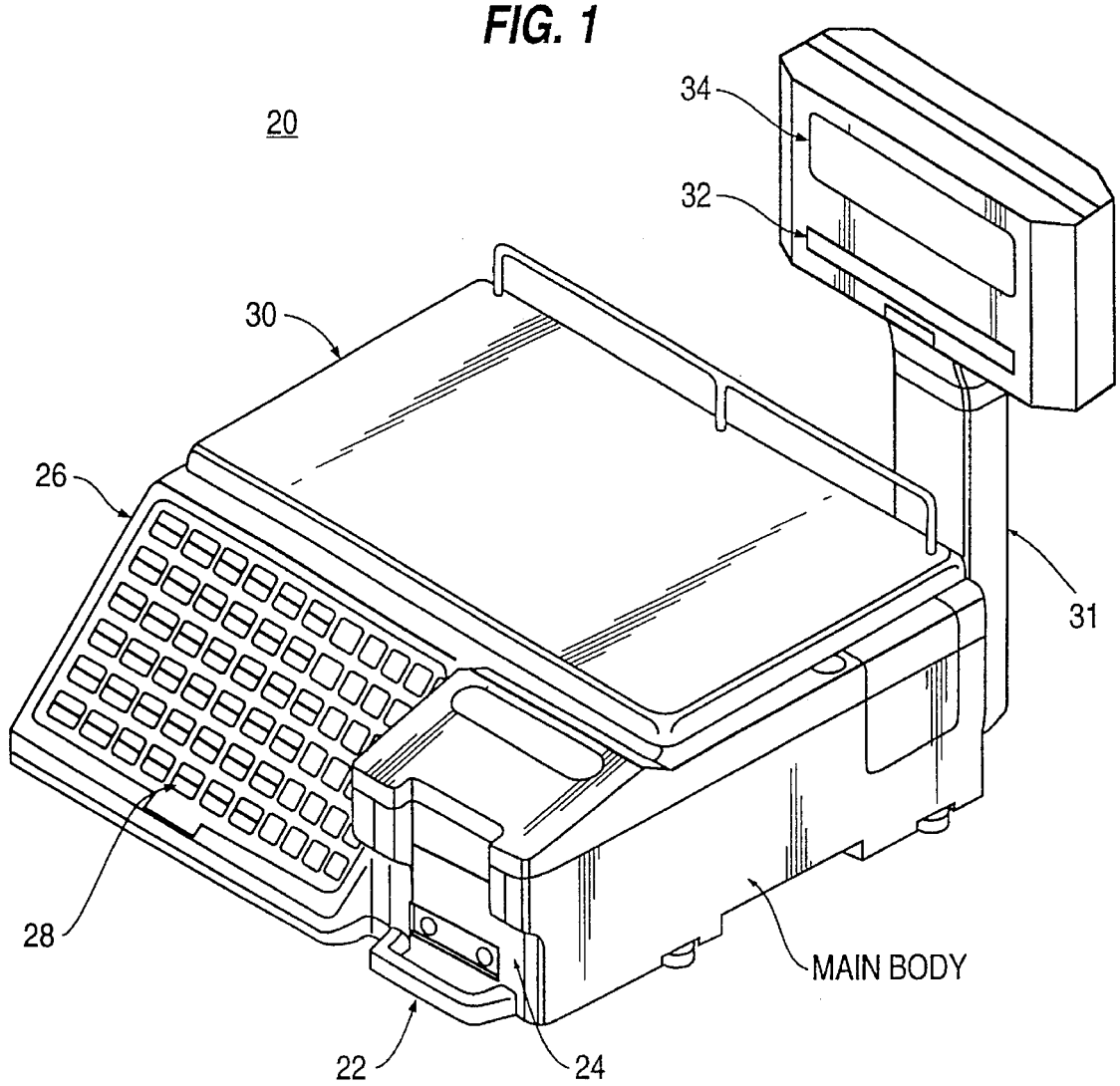
FIG. 1 is a diagram of a weighing scale employing a method according to the present invention.

As shown in FIG. 1, the weighing scale 20 employed in the present invention includes a main body 21 having an opening 24 for the insertion or removal of the label cassette 22. The label cassette 22 can be front loading or side loading. The optimum placement of the cassette opening is in the front of the weighing scale for easy access by the operator for inserting and removing the label cassette 22 and removal of the labels printed by the label cassette 22. The weighing scale 20 also includes a control panel 26, a key sheet 28 located on the control panel 26, a weigh platter 30, and a display column 31 including a seven segment display 32 and a dot matrix display 34.

Figure 2:
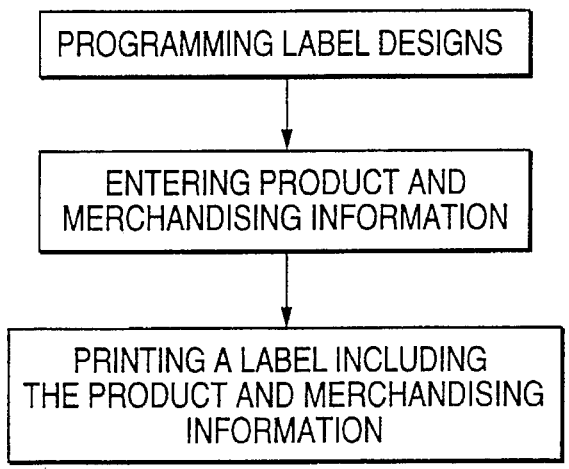
FIG. 2 is a flowchart for generally explaining the operation of the present invention.

The method for generating a label according to the present invention is described with respect to the flowchart in FIG. 2. That is, generally, the present invention prints merchandising information by programming label designs and entering product and merchandising information by way of the key sheet 28. The display prompts the operator and shows the operator what has been programmed. A label is then printed having the merchandising information programmed therein.

Figure 3:
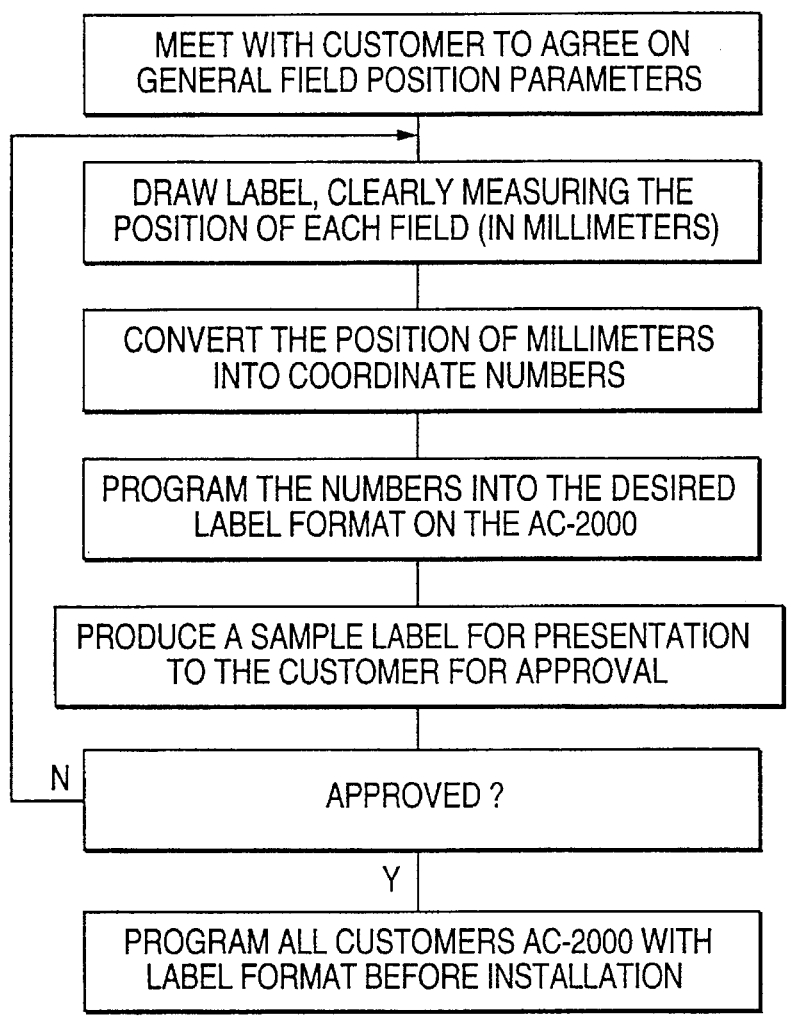
FIG. 3 is a detailed flowchart for programming label designs according to the present invention.

The flowchart in FIG. 3 discloses a method for programming the label designs. First, for example, a distributor which sells the weighing scale meets with a customer to agree on general field position parameters for the labels to be generated. Each label is drawn and the position of each field is clearly measured in millimeters. The position of each field is then converted into coordinate numbers. The coordinate numbers are programmed into a desired label format in a microprocessor (not shown) in the weighing scale 20. A sample of the label is then produced for the customer to determine whether any changes should be made. If the customer does not agree to the format of the label, the label is then redrawn with different field positions. Once the customer agrees to the format of the label, all of the customer's weighing scales 20 are then programmed with the label format before installation into the store, supermarket, etc.

Figure 4:
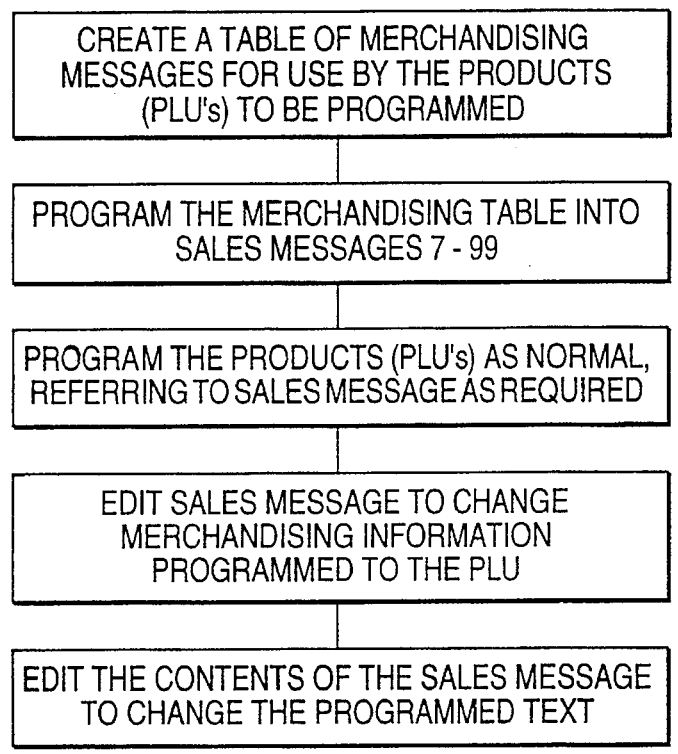
FIG. 4 is a detailed flowchart for entering product and merchandising information according to the present invention.

Product and merchandising information is entered as shown in FIG. 4. That is, a table of merchandising messages for each product is created and then programmed into the microprocessor in the weighing scale 20. The merchandising table is then converted into sales messages. The sales messages have numbers, for example, from 7 to 99, but are not limited to these numbers. Product look-up codes (PLUs) are then programmed into the weighing scale 20 and are programmed to refer to a respective sales message, for example, 7 to 99. To change the merchandising information programmed for each respective PLU code, the sales message can be easily edited by an operator and/or distributor. To change the text programmed as a sales message, that is, change the sales message in location 7, the contents of this location, or any of the locations 7–99, can be quickly and easily edited by an operator. Once all the information regarding the product and message associated therewith is programmed, a label is printed with the programmed information.

Figure 5:
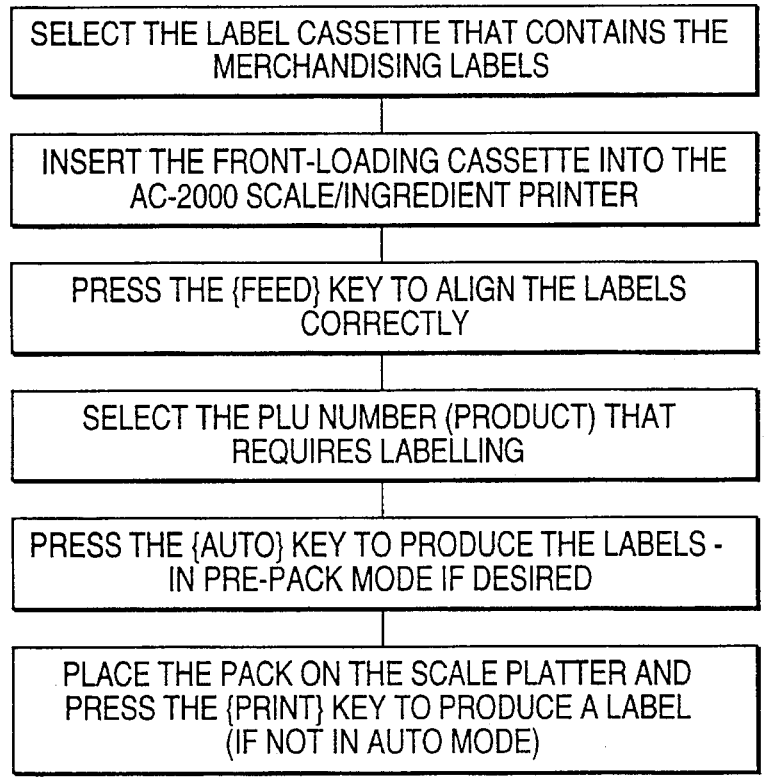
FIG. 5 is a detailed flowchart for printing a label having merchandising information according to the present invention.

The method for printing a label is shown by the flowchart in FIG. 5. First, a label cassette 22 containing the type of merchandising labels required for that product is inserted into the opening 24 in the weighing scale 20. That is, if a coupon is not to be generated for that product, a label cassette containing standard labels can be quickly and easily inserted into the weighing scale 20. If a label to be printed also has a coupon or advertisement associated with the product being weighed, then, for example, a label cassette containing labels having perforations thereon is selected and inserted into the weighing scale. Once the label cassette 22 is inserted into the weighing scale 20, the labels are correctly aligned by, for example, pressing a feed key on the control panel 26. The product to be weighed is then placed on the scale, or if it is a bakery item, the PLU code corresponding to that product is selected. Once the PLU number is selected, a label is printed having the required information thereon by pressing a key on the control panel 26. The weighing scale 20 can also be set to automatically print labels when a package is placed on the weigh platter 30, rather than having to hit a print key.

Figure 6A:
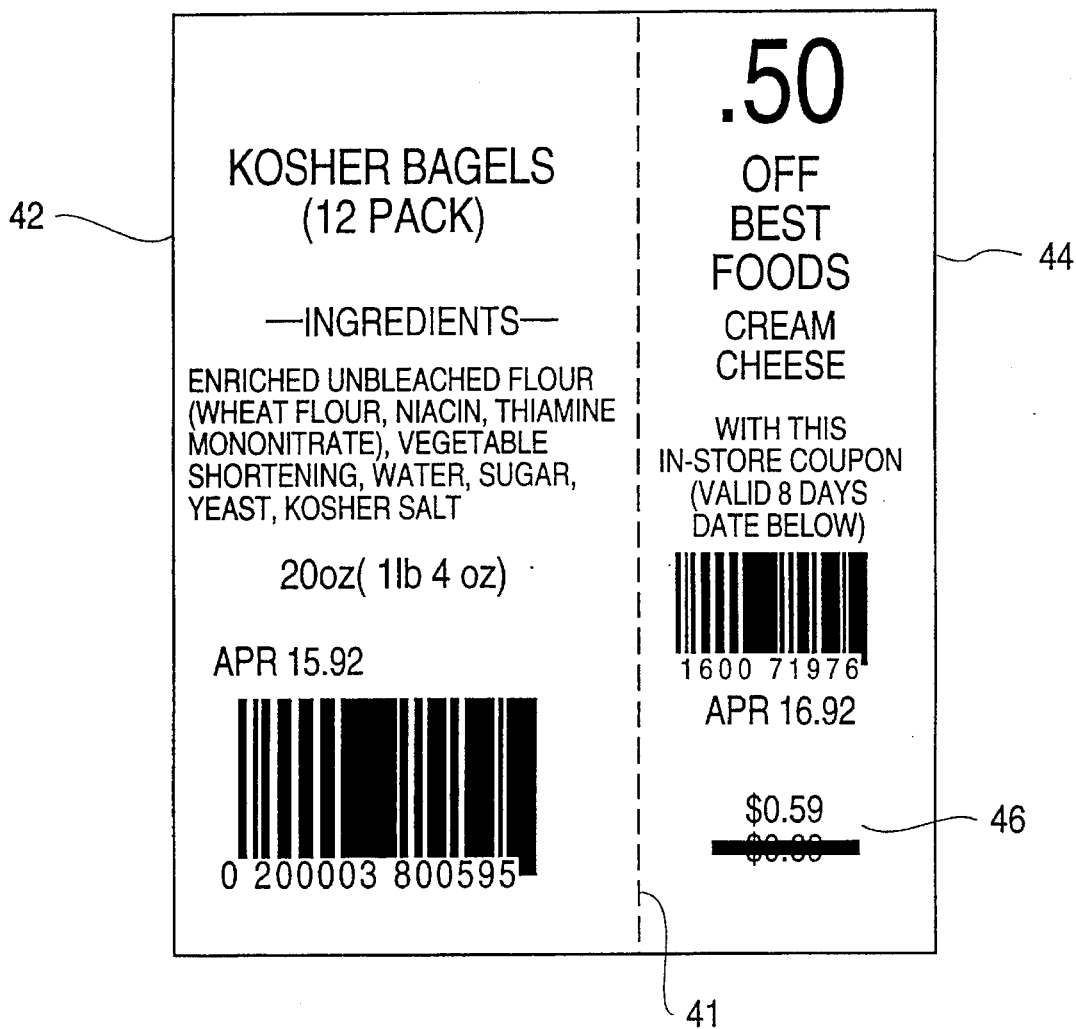
FIGS. 6A–6D are diagrams of labels including label/merchandising information generated by the method according to the present invention.
Figure 6B:

FIGS. 6A–6D are diagrams of various label formats in which label/merchandising information generated by the method of the present invention is printed on a label. Labels of the present invention are shown in FIGS. 6A–6D. Labels 40 according to the present invention have a perforated portion 41 on one of four sides. That is, for example, either a top portion or a bottom portion is perforated in a horizontal direction or a left portion or right portion is perforated in a vertical direction. The portion 42 of the label 40 having product information, can include the product name, ingredients, price per pound, weight, and date, for example. The back of the portion 42 is peeled off so that it adheres to the package. The detachable portion 44 of the label 40 includes a coupon or advertisement. The portion 44 can include the name of an item, cents-off, expiration date, date generated, discounts, a bar code for allowing automatic scanning of the coupon, and any advertising messages. The portion 44 maintains its backing so that it does not stick to the package when the label is adhered thereto. If the customer wishes to use the coupon (detachable portion 44) attached to the label 40, all that is required is that the coupon be torn off at the perforated portion 41. If the label material is sticky, then the backing remains on the coupon. If the label material is non-sticky, then the backing can be removed from the coupon. As noted above, the labels 40 can have a store-generated coupon attached thereto as shown in FIG. 6A. In addition, the labels can be printed by the manufacturer as shown in FIG. 6B so that everyone receives the same coupon no matter what product is being weighed. The manufacturer's label/coupon can be pre-printed with the manufacturer's name. Any of the labels and coupons, whether store generated or manufacturer generated, can be colored using various colors for each label/coupon.

Figure 6C:
Figure 6D:

Further, the store coupon can match certain items with certain products such as shown in FIGS. 6A or 6C. That is, if, for example, a package of bagels is purchased, a coupon off of cream cheese can be generated. Or, for example, a coupon for a packet of cajun spices can be generated when shrimp or fish is purchased, etc. Thus, the coupon can be generated by the weighing scale 20 in accordance with the product purchased. In addition, the weighing scale 20 and printer (not shown) can print regular labels as shown in FIG. 6D without a coupon. If it is not desired to generate a coupon with a purchased product, an advertising message or recipe can be generated instead. The messages and coupons can be easily changed according to various codes in the microprocessor in the weighing scale 20. This allows a store to target its marketing, have control over coupons being generated and easily discount a product if the store is overstocked.

The microprocessor in the weighing scale 20 can be programmed to store various label formats. The label format of the machine can be changed to match the label format in the label cassette.

As noted above, different label formats are preprogrammed by the dealer or distributor. The store determines the UPC code and the PLU code—the PLU code being the product look-up code. In the program mode, the PLU code is typed in along with the product, ingredients, recipes, price, etc. A weighed mode or non-weighed mode is then selected in accordance with whether the item is, for example, a deli item or a bakery item. Further, UPC codes, up to three dates and a time and a discounted price and regular price (see, for example, 46 in FIGS. 6A and 6C) can be programmed.

Figure 7:
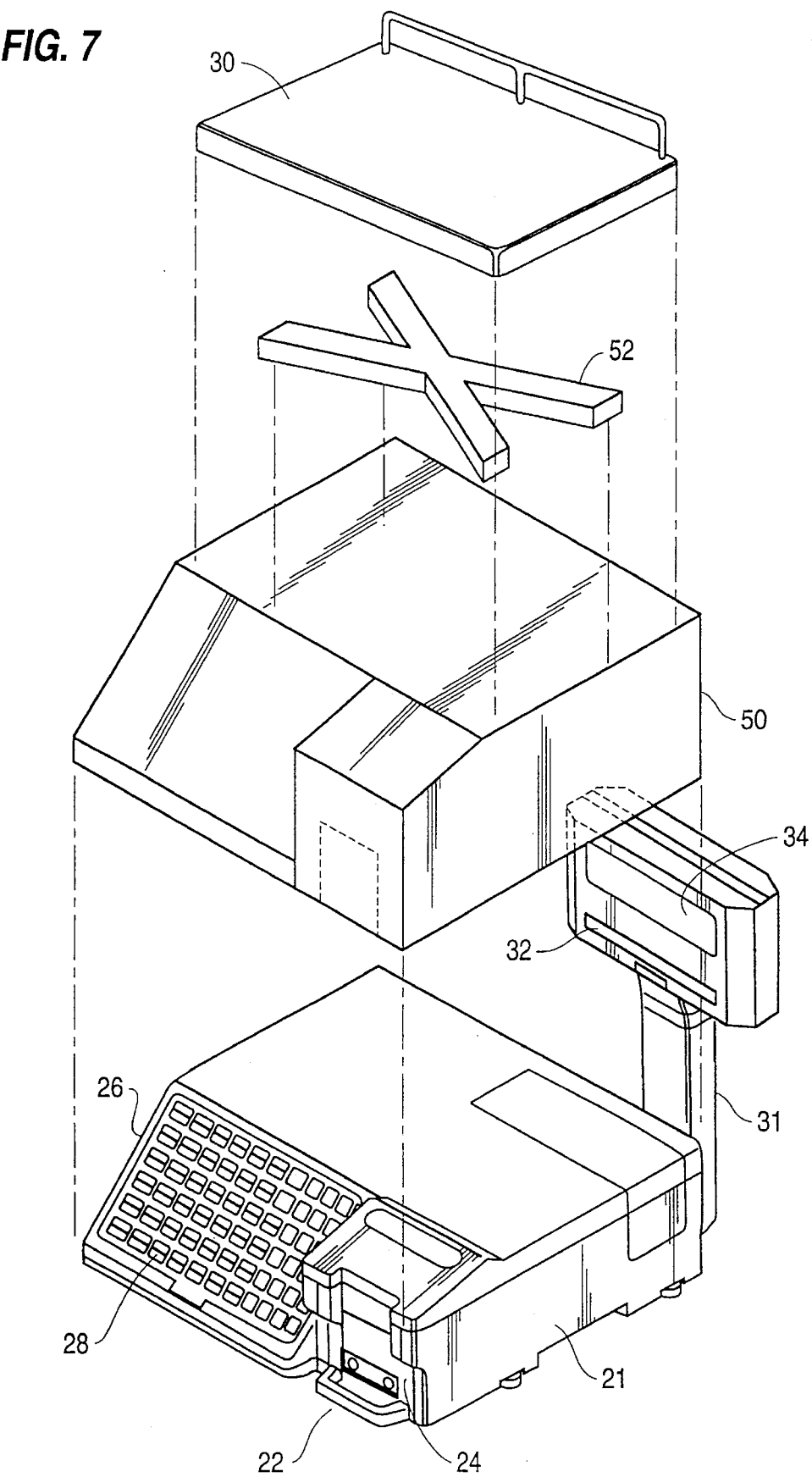
FIG. 7 is a diagram of a weighing scale employing a molded plastic cover according to the present invention.

To protect the weighing scale 20 from moisture and condensation, a cover 50 can be provided as shown in FIG. 7. The cover 50 is a molded plastic cover which covers everything on the scale except for the opening 24 for the label cassette 22 and the weighing platter 30. The cover 50 has a flap to cover the opening 24 so that the label cassette 22 can be easily inserted and removed. The cover 50 is attached under the weighing cross 52 which actually weighs the item, so as not to affect the weight of the item. The molded plastic cover 50 is thin, lightweight and is molded to tightly fit the weighing scale 20 so that there is no problem operating the weighing scale 20. The only portion not covered by the cover 50 is the display column 31 including the 7-segment display 32 and the dot matrix display 34. The cover 50 is removable to allow entry to the weighing machine 20 when servicing is required. The cover 50 can be made of two portions joined together with double-sided tape. The seam is intended to overlap and be in a downward direction to ensure that water does not seep through.

The features of the present invention include a large bright fluorescent alphanumeric dot display 34 plus a numeric display 32. Nine messages can be programmed into the display at selectable speeds. Each message can hold up to 100 characters. In addition, there are, at this time, 93 extra text areas which can be used for recipes, ingredients, or coupon labels. Depending on the microprocessor employed, this area could be increased. Further, nutritional facts can be programmed as part of the PLU code and can be changed immediately by an operator. A word dictionary can be employed in the microprocessor so that codes can be used to replace words in the product description so as to save memory. The device can also network at least 31 scales to a master scale (a total of 32 scales) to facilitate the ease of programming, price changes, etc. A mark down can be shown by price or percent and batch file prices can be updated (that is, an operator can program in price changes for a future date and can activate these price changes when needed). As above-mentioned, optimally, the label cassette 22 is front loading for ease in label production and detachment. Further, at least three dates, for example, a use by date, a sell by date, and the date the store received the product, and a time can be printed. The time can be printed to allow a customer to know when a short shelf life item such as a sandwich has been made, or coffee has been ground. In addition, items can be programmed to be displayed on the display without the need to create a new message or to require additional programming. That is, an item that has been programmed into the memory of a microprocessor can be displayed by merely hitting a sequence of keys rather than retyping the pertinent information. In addition, messages can be programmed to scroll across the display. The messages can hold up to, for example, four lines of information and can correspond to specials for the day, helpful hints or recipes for preparing an item, as noted above. The speed at which the message scrolls across the display is adjustable. The message can flash and/or it can be set up to come on at certain times of the day or on particular days.

The printer employed in the present invention can be any type of printer feasible for use in a weigh scale environment. Programming of information and fixed position parameters depends on the type of programming the microprocessors employ. The present invention was developed and tested employing an AC-2000 manufactured by ISHIDA SCALES MFG. CO., LTD. and ISHIDA U.S.A. INC., but can be adapted to any type of weigh scale.

The foregoing is considered as illustrative only of the principles of the present invention. Further, since numerous modifications and changes will readily occur to those skilled in the art, it is not desired to limit the invention to the exact construction and application shown and described, and accordingly all suitable modifications and equivalents may be resorted to, falling within the scope of the invention and the appended claims and their equivalents.

What is claimed is:

1. A weighing scale, comprising:
   a label cassette easily inserted or removed from a cavity in the weighing scale;
   labels, inserted into said label cassette, each one of said labels having an attachable portion and a detachable portion, the back side of said detachable portion being sticky or non-sticky, when the back side of said detachable portion is sticky, a backing being placed on the sticky layer, the back side of said attachable portion being sticky to attach said attachable portion to a product, when the back side of said detachable portion has said backing, said backing not being removed from said detachable portion when said attachable portion is attached to the product; and printing means for printing said attachable portion of said labels, to be attached to a weighed product, with product information, and printing said detachable portion of said labels with merchandising information including coupon information.

2. A weighing scale according to claim 1, wherein said detachable portion of each one of said labels is detachable in a vertical direction along a left or right portion of said labels.

3. A weighing scale according to claim 1, wherein said detachable portion of said labels is detachable in a horizontal direction along a top or bottom portion of said labels.

4. A weighing scale including a cavity, said weighing scale comprising:

a label cassette insertable into and removable from the cavity;

labels, inserted into said label cassette, each one of said labels comprising:

an attachable portion comprising a first sticky back side, and a detachable portion comprising one of a second sticky back side and a non-sticky back side, said second sticky back side being coupled to a backing, said backing not being removed from said detachable portion when said attachable portion is attached to a product; and printing means for printing said attachable portion of said labels with product information, and for printing said detachable portion of said labels with merchandising information including coupon information.

* * * * *